M. W. COSTELLO.
HOLDER FOR MOTH REPELLENTS.
APPLICATION FILED MAY 12, 1910.
984,352.
Patented Feb. 14, 1911.
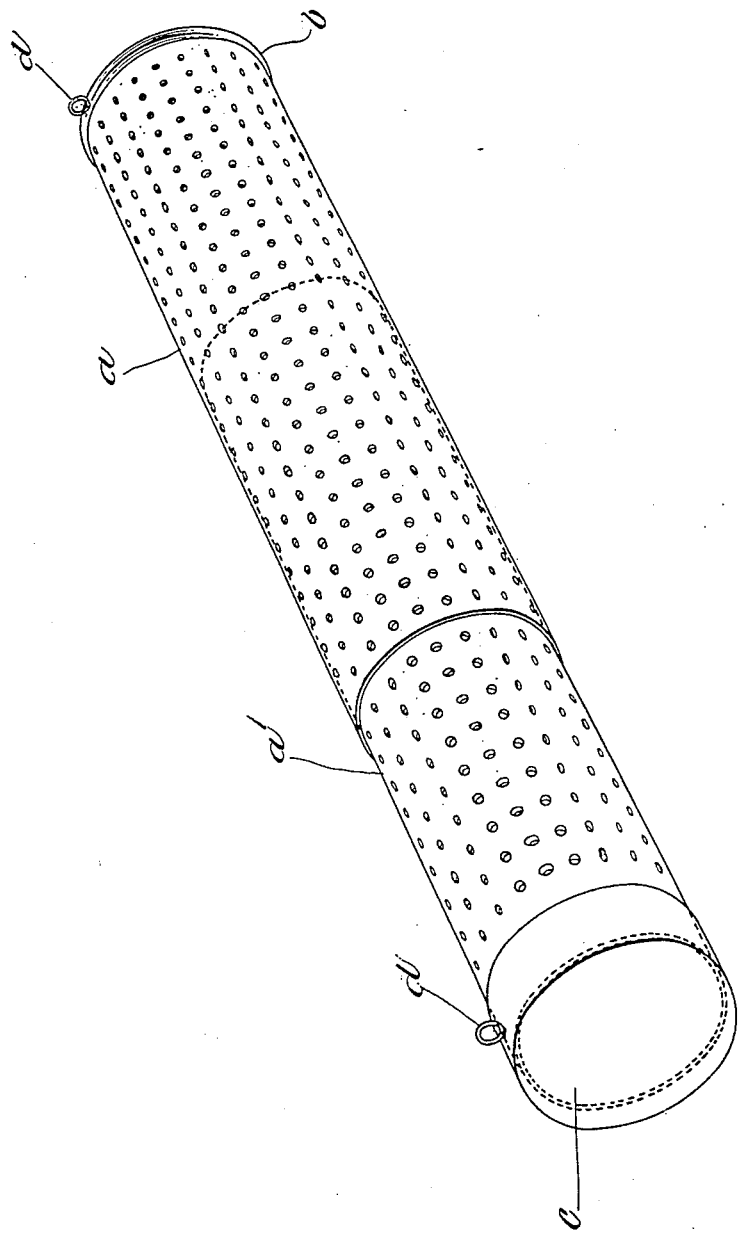

UNITED STATES PATENT OFFICE.

MICHAEL W. COSTELLO, OF BOSTON, MASSACHUSETTS.

HOLDER FOR MOTH-REPELLENTS.

984,352.

Specification of Letters Patent. Patented Feb. 14, 1911.

Application filed May 12, 1910. Serial No. 560,971.

*To all whom it may concern:*

Be it known that I, MICHAEL W. COSTELLO, of Boston, in the county of Suffolk and State of Massachusetts, have invented certain new and useful Improvements in Holders for Moth-Repellents, of which the following is a specification.

This invention has for its object to provide a holder for a moth repellent in dry form such as the well known moth balls or flakes, adapted to be adjusted in length so that the repellent may be permitted to act along the entire length of a row of garments hanging in a wardrobe or closet, or the entire length of a trunk in which garments are stored.

The invention consists in a moth repellent holder composed of a plurality of telescopic perforated tubes, one slidable in another to vary the length of the holder. The perforations are formed to permit a free passage of the odor of the repellent, and the adjustability of the container enables it to extend along the entire length of the row of garments suspended in a wardrobe, whatever the length of the row may be. The adjustability of the holder also enables it to be placed with garments in a trunk and to extend the entire length of the trunk whatever the length may be.

The accompanying drawing, forming a part of this specification, represents a perspective view of a repellent holder embodying my invention.

In the drawing, *a* and *a'* represent two telescoping tubes of perforated sheet metal. The tube *a'* is adapted to slide in the tube *a* so that the two tubes together form a receptacle, the length of which may be varied by moving one tube endwise relatively to the other. The tube *a* has a closed end or head *b* and the tube *a'* has a closed end or head *c* which is formed as a removable cap or closure.

*d, d* represent eyes which are attached to the end portions of the holder and are adapted to engage a suspending cord or loop whereby the device may be suspended in a closet or wardrobe in suitable proximity to a row of garments.

In practice, the described holder will be charged with a moth repellent such as a quantity of the well known moth balls. The perforations of the device *a* and *a'* permit the repellent to act effectively, while the adjustability of the length of the holder formed by said tubes enables it to conform to the extent of the row or accumulation of garments.

When the device is placed in a trunk it is preferably extended so that its ends are in close proximity to the ends of the trunk, the device being adaptable to trunks of various lengths.

It is obvious that the holder may be made of more than two sections if desired, that is to say, one or more telescoping intermediate sections may be interposed between the end sections.

It is obvious that the tubes may be made of woven wire instead of perforated sheet metal, or may be of other foraminous construction. The inner tube is formed to have a close sliding fit on the inner surface of the outer tube, so that when the holder is adjusted to the desired length by sliding the tubes relatively to each other, the length will be maintained by the frictional engagement of one tube with the other.

I claim:

A holder for moth repellent or the like comprising a foraminous tube open at one end and closed at the other, a second foraminous tube open at both ends and telescoping into the open end of the first mentioned tube, a removable cap for the outer end of the second tube, an eye secured to the edge of the periphery of the closed end of the first tube, and an eye secured to the periphery of said cap, said holder being adapted to be suspended by said eyes beneath the entire length of a row of suspended garments.

In testimony whereof I have affixed my signature, in presence of two witnesses.

MICHAEL W. COSTELLO.

Witnesses:
C. F. BROWN,
P. W. PEZZETTI.